May 30, 1961
M. C. SNYDER
2,986,159
CONSTANT PRESSURE VALVE
Filed April 1, 1958
2 Sheets-Sheet 2
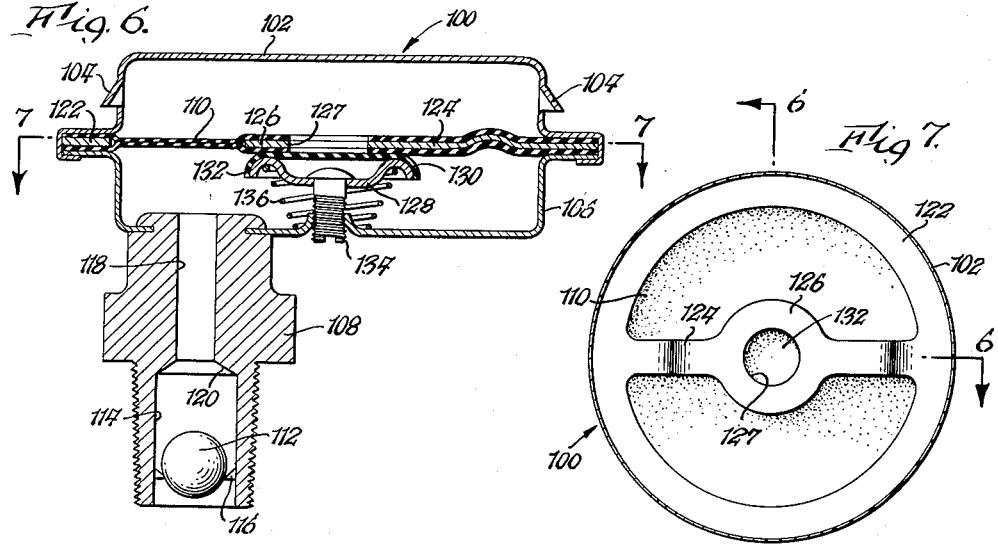
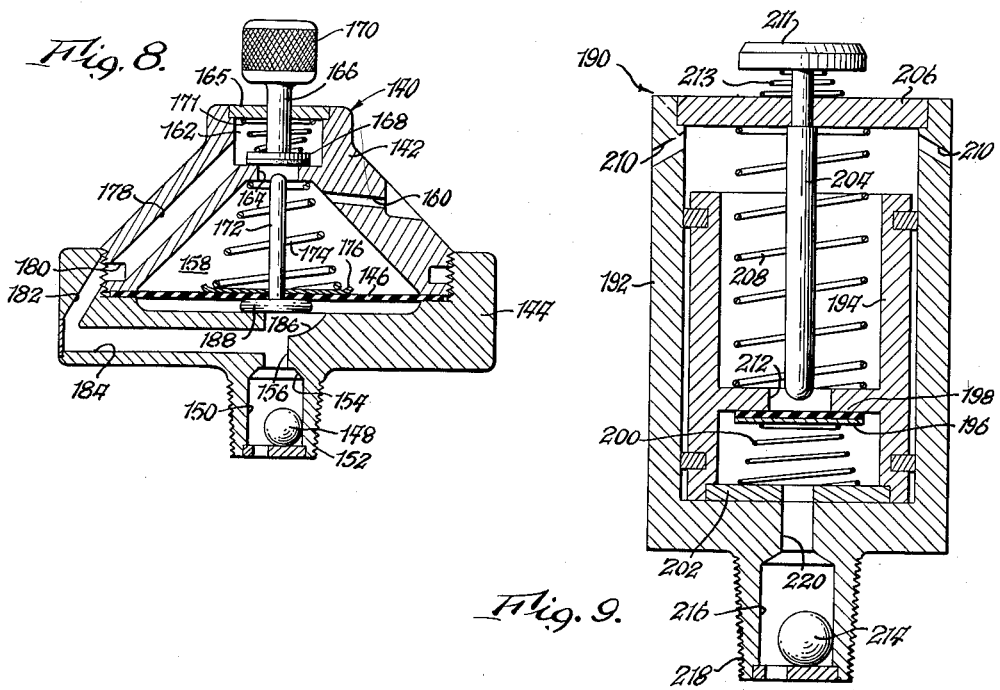
INVENTOR.
Mahlon C. Snyder
BY
Pappand Sommer
Attorneys.

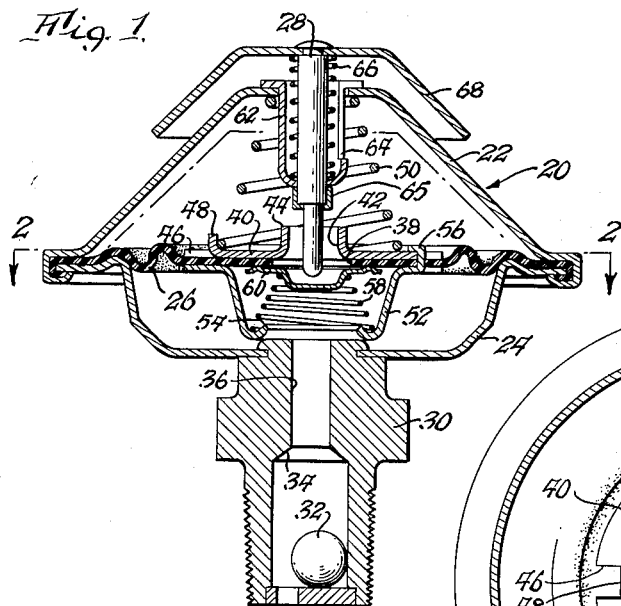

United States Patent Office 2,986,159
Patented May 30, 1961

2,986,159
CONSTANT PRESSURE VALVE
Mahlon C. Snyder, 42 Eastwood Road, Wanakah, N.Y.
Filed Apr. 1, 1958, Ser. No. 725,700
5 Claims. (Cl. 137—493)

This invention relates to constant pressure valves and more particularly to a bi-directional gas or vapor pressure regulating valve.

The valve of the present invention is especially useful for maintaining gas or vapor at a constant pressure in an enclosed container, which pressure may tend to vary, as in the case of a gasoline tank. When used in such containers, the valve of the present invention will prevent build-up of pressure in the tank beyond a predetermined value, and in addition will also prevent a low pressure or vacuum from developing therein. The valve responds to a pressure differential acting upon a diaphragm in either of two opposite directions, hence it may be classified as a bi-directional valve. In one form of the invention, the valve is arranged for manual operation whereby valve opening may be accomplished prior to attainment of the pressure differential necessary for automatic operation. In all forms of the invention disclosed, it will be apparent that great simplicity of structure and reliability of operation is provided.

The main object of this invention is to provide a bi-directional pressure regulating valve.

A more specific object is to provide a pressure regulating valve that will prevent build-up of pressure in an enclosed tank, as well as the prevention of a low pressure or vacuum from developing therein.

Still another object is to provide a bi-directional pressure regulating valve arranged for manual operation whereby valve opening may be accomplished prior to attainment of the pressure differential necessary for automatic operation.

Still another object is to provide a bi-directional pressure regulating valve which is simple in structure and reliable in operation.

These and further objects and features of the invention will be apparent from the following description and accompanying drawings wherein:

Fig. 1 is a vertical section view of a bi-directional pressure valve embodying the principles of the invention;

Fig. 2 is a section view generally as seen along line 2—2 in Fig. 1;

Fig. 3 is a vertical section view of another form of bi-directional pressure valve embodying the principles of the invention.

Fig. 4 is a fragmentary view generally as seen along line 4—4 in Fig. 3;

Fig. 5 is a fragmentary view generally as seen along line 5—5 in Fig. 3;

Fig. 6 is a vertical section view of another form of bi-directional pressure valve embodying the principles of the invention;

Fig. 7 is a view generally as seen along line 7—7 in Fig. 6;

Fig. 8 is a vertical section view of another form of bi-directional pressure valve embodying the principles of the invention; and Fig. 9 is a vertical section view of another form of bi-directional pressure valve embodying the principles of the invention.

Referring now to the drawings and more particularly to Figs. 1 and 2, the numeral 20 identifies a bi-directional valve embodying the principles of the invention, which valve includes an upper housing portion 22, a lower housing portion 24, a flexible diaphragm 26 supported about its periphery by the housing portions 22 and 24, the latter being crimped or held together as shown, and a plunger 28 for the manual operation of the valve. The lower housing portion 24 has affixed thereto a threaded connection piece 30, having an enclosed ball 32 adapted to rest upon a valve seat 34 to prevent flow of liquid through the connection piece via a passageway 36 and into the lower housing portion 24, should the valve be turned upside-down.

The diaphragm 26, which is preferably formed of a fabric made of a strong synthetic material, such as nylon, impregnated with rubber, is provided with a centrally arranged hole 38. On the upper side of the diaphragm is a disc-like element 40, having a central hole or opening 42 with a flange 44 surrounding the hole. A plurality of slots 46 is arranged about the periphery of the element 40, the alternate slots having upwardly extending integral fingers 48, which serve to position the lower end of a conical spring 50, which is compressively arranged between the element 40 and the upper housing portion 22.

A cup-like element 52, having an opening with an upturned edge 54, is arranged on the lower side of the diaphragm 26, so that the bottom thereof is a slight distance from the inside of the housing portion 24. The element 52 has integral fingers 56 which extend upwardly through the diaphragm and are bent over in the slots 46, that is, those slots that do not have fingers 48. A conical spring 58, is compressively arranged between a cupped disc valve 60 covering the hole 38, and the upturned edge 54 of the element 52. The disc valve 60 is thus normally maintained in sealing engagement against the lower side of the diaphragm 26.

Projecting downwardly in the upper housing portion 22 and supported thereby, is a sleeve element 62 being formed with elongated slots 64 which provide open communication between the atmosphere and the interior of the upper housing portion 22. The sleeve element 62 slidingly supports at its lower end, the plunger 28, the latter having a channel member 65 arranged toward the lower end thereof, which abuts the exterior of the sleeve element 62 in the non-operative position of the plunger 28, and the top of the flange 44 in operative position of the plunger. A spring 66 is arranged about plunger 28, and is maintained in compression between the lower end of the sleeve 62 and a flared knob 68 mounted upon the plunger 28.

When the pressure acting on each side of the diaphragm 26 is equal, there will be no deflection of the diaphragm, as will be understandable. However, unequal pressures, will create a pressure differential upon the diaphragm resulting in automatic valve operation in either of two ways.

In the first case, assume that the ambient pressure is greater than the gas or vapor pressure within the container (not shown), to which the valve 20 is affixed. A pressure differential will result causing the diaphragm 26 to deflect downwardly so that the cup-like element 52 seats upon the inside of the lower housing portion 24, or the inner end of the connection piece 30. The pressure differential will then cause the disc valve 60 to move downwardly and away from sealing engagement with the underside of the diaphragm 26, thus allowing flow of air into the lower housing portion 24 to eventually cause an equalization of pressure acting upon the diaphragm 26. When this occurs, the spring 58 will expand and move the disc valve 60 back into sealing engagement with the underside of the diaphragm, and the latter will return to original, non-deflected position (Fig. 1) in such manner the valve 20 will automatically operate to prevent a sub-atmospheric pressure or vacuum from developing or remaining within the container to which it is affixed.

In the second case, assume that the ambient pressure is less than the gas or vapor pressure within the container. A pressure differential will result causing the diaphragm 26 to deflect upwardly until the disc valve 60 will engage the lower end of the plunger 28. Further upward movement of the diaphragm will cause the latter to move away from sealing engagement with the disc valve 60, thus allowing flow of vapor from the lower housing portion 24 into the upper housing portion 22 and to the atmosphere via slotted sleeve 62. As a result there will be an eventual equalization of pressures acting upon the diaphragm 26, and a return of the latter to normal or non-deflected position (Fig. 1). In such manner the valve 20 will automatically operate to prevent a super-atmospheric pressure from developing or remaining within the container to which it is affixed.

The pressure differentials to which the valve 20 will be responsive for bi-directional operation, will obviously be determined by the compressive resistance of springs 50 and 58, and, or also by predetermined length of plunger 28 or vertical adjustment of said plunger 28 which are factors easily established by those skilled in the art for any given valve constructed according to the principles of the invention.

The manual control of valve 20, may be realized by depressing the plunger 28 so that it will move the valve 60 from engagement with the diaphragm 26. Such manual control may obviously be utilized to dissipate either a sub-atmospheric or a super-atmospheric pressure within the container to which it is affixed.

A valve 70 illustrative of a modified form of the invention is shown in Figs. 3 to 5 inclusive, which valve includes an upper housing portion 72 having one or more openings 73 formed therein, a lower housing portion 74 secured to the upper housing portion by fastening means such as rivets 76, a threaded connection piece 78 with a ball valve 80, both of which are similar in structure and function to connection piece 30 and ball 32 of the first embodiment, and a diaphragm 82 positioned within the housing portions 72 and 74 and secured therebetween along the periphery. A hole or opening 83 is formed in the middle of the diaphragm. A metal gasket 84 is interposed between the edge of the upper housing portion 72 and the diaphragm 82, and has a pair of inwardly projecting spring-like fingers 86 generally parallel to and in engagement with the upper surface of the diaphragm, the ends of the fingers coinciding with the edge of the diaphragm hole 83.

Affixed to the underside of the diaphragm 82 by rivets 87, which extend through the diaphragm and the fingers 86, is a valve retainer 88 which is in the form of a recessed disc having a plurality of inwardly projecting and upwardly curved fingers 90. The fingers 90 resiliently hold a concave disc valve 92 in engagement with the edge of the diaphragm opening 83, to prevent flow of gas therethrough. The strength of the fingers 90 is such as to yield and allow unseating of the valve 92 when a pressure differential of predetermined magnitude acts upon the valve to move it downwardly. Directly above the valve 92 is a screw 94 threadably supported in the upper housing portion 72, which screw has a bifurcated end 96 arranged for engagement with the disc valve 92 when the latter is moved upwardly with the diaphragm 82. By adjusting the axial setting of the screw 94 relative to the valve 92, the amount of deflection of diaphragm 82 in response to a given pressure differential acting thereupon may be varied.

The operation of valve 70, which is wholly automatic, responds to pressure differentials acting in either of two directions upon the diaphragm 82. In the first case, assume that the ambient pressure is greater than the gas or vapor pressure within the container (not shown) to which the valve 70 is affixed. A pressure differential will result causing the diaphragm 82 to deflect downwardly until further movement is substantially prevented by the fingers 86. Following this, the pressure differential will cause downward movement of the disc valve 92 against the supporting effort of fingers 90, whereupon the valve 92 will be unseated from the edge of the hole 83, allowing flow of air from the atmosphere to pass from the upper housing portion 72 to the lower housing portion 74 to eventually cause an equilization of pressure acting upon the diaphragm 82. When this occurs, the fingers 90 will return the disc valve 92 to seated position upon the edge of the opening 83, and the diaphragm will return to original non-deflected position (Fig. 3). In such manner the valve 70 will automatically operate to prevent a sub-atmospheric pressure or vacuum from developing or remaining within the container to which it is affixed.

In the second case, assume that the ambient pressure is less than the gas or vapor pressure within the container to which the valve 70 is affixed. A pressure differential will result causing the diaphragm 82 to deflect upwardly until the disc valve 92 will engage the lower end 96 of the screw 94. Further upward movement of the diaphragm 82 will result in the unseating of the disc valve 92 from the edge of the hole 83, thus allowing flow of vapor from the lower housing portion to atmosphere via the housing hole 73. As a result there will be an eventual equilization of pressures acting upon the diaphragm 82, and a return of the latter to normal or non-deflected position (Fig. 3). In such manner the valve 70 will automatically operate to prevent a super-atmospheric pressure from developing or remaining within the container to which it is affixed.

It will be apparent that the operation of the valve 70 will be determined by the resilient strength of the fingers 86 and fingers 90, as well as by adjustment of screw 94, for pressure regulation to very close tolerances or as desired, both of which are factors easily established by those skilled in the art for any given valve constructed according to the principles of the invention.

A valve 100 illustrative of a further modified form of the invention is shown in Figs. 6 and 7, said valve including an upper housing portion 102 having openings 104 formed therein, a lower housing portion 106 secured to the upper housing by crimping as shown, a threaded connection piece 108 affixed to the lower housing portion 106, and a diaphragm assemblage 110 positioned within the housing portions 102 and 106 and secured therebetween along the periphery. A ball 112 is arranged in a bore 114 formed in the connection piece 108, and is supported therein by fingers 116. The bore 114 connects with a passageway 118 that extends upwardly and opens into the lower housing portion 106. A conical valve seat 120 is formed at the point of intersection between the bore 114 and passageway 118, which is adapted for seating of the ball 112, when the valve 100 is turned upside down, to prevent flow of liquid from the enclosed container (not shown) to which the valve is affixed. In normal position of the valve 100, the fingers 116 and ball 112 allow flow of gas or vapor in either direction through the connection piece 108.

The diaphragm 110, which is preferably formed of rubber is split in two halves and has sandwiched between the halves a metallic gasket 122 having two inwardly extending arms 124 arranged at their inner ends to form a washer-like portion 126. A hole 127 passes through the center of the diaphragm assemblage 110. Positioned beneath the diaphragm assemblage 110, is a valve including a disc 128 having a cupped periphery 130, and a rubberlike element 132 supported on the top of the disc 128 in the region of the cupped periphery 130. The disc 128 is slidably mounted upon the upper end of a screw 134, which may be axially adjusted to regulate the contact pressure between the valve element 132 and the underside of the diaphragm assemblage 110. A conical spring 136 is compressively arranged between the disc 128 and the inside of the lower housing portion 106.

The valve 100 will operate in response to pressure differentials acting in either of two directions upon the diapragm assemblage 110. In the first case, an ambient pressure greater than the gas or vapor pressure within the container to which the valve 100 is affixed, will create a pressure differential that will act upon the diaphragm assemblage 110 and deflect it downward to the extent allowable by the gasket 122. Thereafter, the pressure differential will cause an unseating of the valve element 132 from the lower side of the diaphragm about the hole 127, to allow flow of air into the lower housing portion and the enclosed chamber, to cause an equalization of pressures and a dissipation of the pressure differential. When the latter is effected, the spring 136 will reseat the valve element 132, and the valve will assume normal position (Fig. 6).

When the ambient pressure is less than the vapor or gas pressure within the enclosed container to which the valve 100 is affixed, a pressure differential will act upon the diaphragm assemblage 110, to lift it upwardly and out of contact with the valve element 132 and uncover the hole 127. When this occurs, the pressure on the underside of the diaphragm assemblage will be released, and the pressure differential dissipated. Accordingly, the diaphragm assemblage 110 will move downwardly due to the resiliency of the gasket arms 124, and the valve 100 will be returned to normal position (Fig. 6).

In such manner, the valve 100 will automatically function to prevent build-up or maintenance of sub-atmospheric or super-atmospheric pressure within the enclosed container to which the valve is affixed. It will be apparent that the operation of the valve will be determined by the resilient strength of the gasket arms 124 and the spring 136, also by axial adjustment of screw 134, which are factors easily established by those skilled in the art for any given valve constructed according to the principles of the invention. When screw 134 is moved downward it also moves disc 128 in the same direction thus decreasing pressure; upward movement of the screw will result in increase of pressure.

A valve 140 illustrative of another modified form of the invention is shown in Fig. 8, which valve may be mounted upon an enclosed container (not shown) and which includes a housing portion 142, a base cap 144 threadably affixed to the housing portion, and a diaphragm 146 secured about its periphery between the housing portion and base cap. A ball 148 is enclosed in a chamber 150 provided in a threaded portion 152 formed integral with the base cap 144, which ball is arranged to engage a valve seat 154, to prevent flow of liquid into a passageway 156, should the valve be turned upside down.

Passageway 156 extends upwardly and opens into the lower portion of a chamber 158 formed in the housing portion 142. A passageway 160 connects the chamber 158 to atmosphere. In the upper region of the housing portion 142 is a valve chamber 162 which is connected to the chamber 158 by means of a short passageway 164. A cover 165 encloses the valve chamber 162, and slidably supports a valve 166 having at one end a rubber faced valve head 168 arranged to seat upon the passageway 164, and a knob 170 at the other end and on the outside of the cover 165. A conical spring 171 is compressively arranged between the cover 165 and the valve head 168.

A plunger 172 is mounted for movement with the diaphragm 146, and is arranged to engage the valve head 168 when the diaphragm moves upwardly a given amount. Compressively arranged within the chamber 158, is a conical spring 174 which surrounds the plunger 172, one end of the spring 174 being seated against the upper wall of the chamber 158, the other end of which seats against a washer 176 arranged on the upper surface of the diaphragm 146.

Extending downwardly from the valve chamber 162 is a passageway 178 which opens into a groove 180 extending about the threaded lower end of the housing portion 142. A passageway 182 is formed in the base cap 144, one end of the passageway 182 being in alignment with the groove 180, the other end opening into a passageway 184 which joins with the passageway 156. A groove or divergent passageway 186 leads from the passageway 156 to the chamber 158 beneath the diaphragm 146 to assure open communication with the chamber 158 even when a head 188 of the plunger 172 is seated upon the end of passageway 156.

The valve 140 will operate to maintain a given vapor or gas pressure within an enclosed container to which it is affixed. It will be seen that if the pressure in the container is below atmospheric pressure, a pressure differential will be created upon the valve head 168, which when of a given value, will lift the valve from seated position on the end of passageway 164 and connect the interior of the enclosed container with atmosphere. The pressure in the enclosed container will thus be equalized with the atmospheric pressure. When the pressure in the enclosed container is above atmospheric pressure, a pressure differential will be created upon the diaphragm 146, and cause upward movement of the plunger 172 to unseat the valve head 168 and connect the interior of the enclosed container with the atmosphere, to equalize the interior pressure with atmosphere.

In such manner the valve 140 will automatically operate to maintain a given pressure within the enclosed container. Obviously, the operating characteristics of the valve will depend upon the strength of spring 174 and spring 171, and the length of plunger 172 which factors may be established by anyone skilled in the art to produce a valve with desired operating characteristics.

The valve 140 may also be operated manually by simply unseating the valve head 168 by lifting or pulling upwardly upon the valve knob 170. It will be seen that such action will condition the valve 140 so that the interior of the enclosed container to which the valve is affixed, will be opened to atmosphere.

Another modified form of a valve embodying the principles of the invention is illustrated in Fig. 9, and is identified by the numeral 190. Valve 190 includes a cylinder or housing 192, a cylindrical piston 194 slidably arranged within the cylinder 192, a rubber-faced disc valve 196 positioned within the piston and maintained upon a valve seat portion 198 by means of a conical spring 200 that is compressively arranged between the disc valve 196 and a closure piece 202 affixed within the lower end of the piston 194, and a plunger 204 slidably mounted in a cover 206 affixed within the upper end of the cylinder 192. A helical spring 208 is compressively arranged between the valve seat portion 198 and the cover 206, to constantly urge the piston 194 toward the lower end of the cylinder 192. Holes 210 arranged in the wall of the cylinder 192 near the upper end thereof, maintain the interior of the cylinder, toward the upper end, in open communication with the atmosphere. A knob 211 is provided on the outer end of the plunger 204, while a conical spring 213 is compressively arranged between the knob and the cover 206 to maintain the knob away from the cover.

A hole 212 is formed in the valve seat portion 198 which allows passage of the end of the plunger 204 therethrough to engage and unseat the disc valve 196. Such unseating may occur in either of two ways: first by movement of the piston 194 upwardly a given amount, and second, by movement of the plunger 204 downwardly a given amount.

A ball check valve 214 is maintained in a cavity 216 provided in a connecting piece 218 formed integral with the cylinder 192 at the lower end thereof. A passageway 220 formed in the cylinder 192 and closure piece 202, connects the cavity 216 with the volume within the piston 194 beneath the disc valve 196.

The valve 190 will automatically operate to maintain a given gas or vapor pressure within an enclosed container (not shown) to which the valve is affixed. When the pressure in the enclosed container is sub-atmospheric, a pressure differential will be created upon the disc valve 196, causing it to be unseated whereby the interior of the container will be opened to atmosphere. The pressure in the container will thus be equalized with atmospheric pressure. When the pressure in the enclosed container is above atmospheric pressure, a pressure differential will be created upon the valve seat portion 198, and the piston 194 will be moved upwardly. Such movement will result in the unseating of the disc valve 196, by engagement with the end of the plunger 204, resulting in the opening of the container to atmosphere and the equalization of the gas or vapor pressure therein.

Obviously, the valve operating characteristics will depend upon the compressive strength of springs 198 and 208, which may be established by those skilled in the art, to produce a valve with desired operating characteristics. Close pressure tolerances may be obtained by various lengths of plunger 204.

The valve may be also operated manually by simply unseating the disc valve 196 by pushing downwardly a given amount upon the plunger head 211. It will be seen that such action will condition the valve 190 so that the interior of the enclosed contained to which the valve is affixed, will be opened to atmosphere.

While each of the embodiments of the invention disclosed above, will function to fulfill the objectives set forth thereinbefore, each may possess unique characteristics which render the valve especially advantageous in any given installation.

The foregoing description has been given in detail without thought of limitation since the inventive principles involved are capable of assuming other physical embodiments without departing from the spirit of the invention and the scope of the appended claims.

What is claimed is:

1. A valve for maintaining a predetermined gas or vapor pressure within an enclosed container, said valve including an enclosed housing, a movable wall mounted in the housing and having a valve seat portion separating the interior of the housing into two separate volumes, one of said volumes being connected to the atmosphere, a movable valve head resiliently maintained on the valve seat portion on the other volume side, a spring compressively arranged upon the valve seat portion on the one volume side, a connection piece arranged to connect the housing to an enclosed container, said connection piece formed with a passageway opening into the other volume side, a plunger arranged in a slideway provided in said housing to unseat the movable valve head when the movable wall has moved a given distance from the other volume end of the housing to the one volume end of the housing, a stop fixed to said housing and limiting movement of said plunger in the direction away from said movable valve head, and a spring interposed between said plunger and housing and biasing said plunger toward said top.

2. A bi-directional valve opened in response to reverse pressure differentials on opposite sides thereof, comprising a hollow housing, a sheet of flexible material arranged generally in a single plane across said housing and having its margin secured to said housing and forming a diaphragm which divides said housing into two volumes severally exposed to said pressure differentials, said diaphragm being provided with a central opening, a first disc-like element on one side of said diaphragm and having a hole registering with said opening, a second disc-like element on the other side of said diaphragm and having a hole registering with said opening, means securing said disc-like elements and diaphragm together whereby said disc-like elements move bodily with said diaphragm in response to changes in the pressure differentials in said volumes, a valve disc seating toward said diaphragm to close the hole therethrough, a spring interposed between said valve disc and one of said disc-like elements and biasing said valve disc to a closed position, and means operatively interposed between said valve disc and said housing portions and opening said valve disc in response to a predetermined movement of said diaphragm in a corresponding direction.

3. A bi-directional valve opened in response to reverse pressure differentials on opposite sides thereof, comprising a hollow housing, a sheet of flexible material having its margin secured to said housing and forming a diaphragm which divides said housing in two volumes severally exposed to said pressure differentials, said diaphragm being provided with a central opening, a first disc-like element on one side of said diaphragm and having a hole registering with said opening, a second disc-like element on the other side of said diaphragm having a hole registering with said opening, means securing said disc-like elements and diaphragm together whereby said disc-like elements move bodily with said diaphragm in response to changes in the pressure differentials in said volumes, a valve disc seating toward said diaphragm to close the opening therethrough and opening toward one of said disc-like elements, stop means operatively interposed between said one of said disc-like elements and said housing and limiting the movement of said diaphragm in a corresponding direction, a spring interposed between said valve disc and said one of disc-like elements and biasing said valve disc to closed position, and means operatively interposed between said valve disc and housing and opening said valve disc in response to a predetermined movement of said diaphragm in a corresponding direction.

4. A bi-directional valve as set forth in claim 3 including a compression spring operatively interposed between the other of said disc-like elements and housing and biasing said diaphragm to effect engagement of said stop means.

5. A bi-directional valve opened in response to reverse pressure differentials on opposite sides thereof, comprising a housing, a diaphragm across the interior of said housing and dividing said housing into two volumes, said diaphragm being provided with a central opening, a first disc-like element on one side of said diaphragm and having a hole registering with said opening, a second disc-like element on the other side of said diaphragm having a hole registering with said opening, means securing said disc-like elements and diaphragm together whereby said disc-like elements move bodily with said diaphragm in response to changes in the pressure differentials in said volumes, a valve disc seating toward the diaphragm to close the hole therethrough and opening toward one of said disc-like elements, a spring interposed between said valve disc and said one of said disc-like elements and biasing said valve disc to a closed position, a manually operable plunger slidingly mounted in said housing to project exteriorly thereof and arranged to engage and open said valve disc, and a spring biasing said plunger to an inoperative position.

References Cited in the file of this patent

UNITED STATES PATENTS

| | | | |
|---|---|---|---|
| 2,674,268 | Kimm | | Apr. 6, 1954 |
| 2,681,074 | Frentzel | | June 15, 1954 |
| 2,693,821 | Cornelius | | Nov. 9, 1954 |
| 2,827,076 | Obermair | | Mar. 18, 1958 |

FOREIGN PATENTS

| | | | |
|---|---|---|---|
| 518,482 | Great Britain | | Feb. 28, 1940 |
| 908,989 | France | | Nov. 12, 1945 |
| 671,186 | Great Britain | | Apr. 30, 1952 |